United States Patent [19]

Hiyama et al.

[11] 4,255,922
[45] Mar. 17, 1981

[54] APPARATUS FOR USE IN DRYING AND HARVESTING VINE BORNE CROPS AND PERFORMING OTHER WORK OPERATIONS

[76] Inventors: Kazuo Hiyama, 8184 E. Adams; Howard K. Hiyama, 8180 E. Adams, both of Fowler, Calif. 93625

[21] Appl. No.: 844,147

[22] Filed: Oct. 21, 1977

[51] Int. Cl.³ .............................................. A01D 46/00
[52] U.S. Cl. ........................................ 56/330; 47/1.7; 239/121; 239/172
[58] Field of Search ............... 56/330, 331, 1, DIG. 2, 56/328 R; 47/1.7; 239/172, 121, 124, 144

[56] References Cited

U.S. PATENT DOCUMENTS

| | | | |
|---|---|---|---|
| 3,276,194 | 10/1966 | Mohn et al. ............................ | 56/330 |
| 3,507,101 | 4/1970 | Bernshausen ...................... | 56/328 R |
| 3,546,856 | 12/1970 | Hiyama ..................................... | 56/1 |
| 3,584,787 | 6/1971 | Thomason ............................ | 239/172 |
| 3,601,964 | 8/1971 | Fisher ..................................... | 56/330 |
| 4,030,244 | 6/1977 | Tennes et al. .......................... | 47/1.7 |
| 4,168,798 | 9/1979 | Moore et al. ........................... | 47/1.7 |

*Primary Examiner*—Jay N. Eskovitz
*Attorney, Agent, or Firm*—Huebner & Worrel

[57] ABSTRACT

An apparatus for harvesting vine borne crops and performing other work operations having a frame adapted to be transported along the vines to cause the crops in the zone to move relative to the frame along a path through the frame, a conduit borne by the frame in proximity to the path, a system for supplying fluid under pressure to the conduit, and a plurality of vents mounted on the conduit for individually releasing the fluid from the conduit in a substantially continuous fluid stream to immerse the crops during relative movement along the path.

13 Claims, 13 Drawing Figures

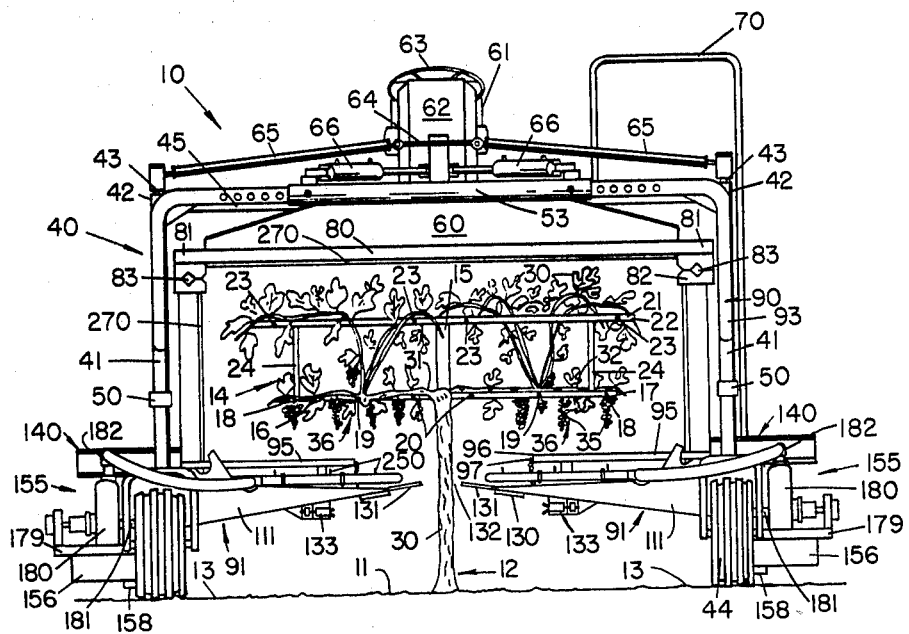

APPARATUS FOR USE IN DRYING AND HARVESTING VINE BORNE CROPS AND PERFORMING OTHER WORK OPERATIONS

BACKGROUND OF THE INVENTION

1. Field of the Invention

The present invention relates to a method and apparatus for use in drying and harvesting vine borne crops and more particularly to such a method and apparatus which achieve conspicuous success to a degree not heretofore possible, in the drying of grapes on their vines to form raisins and in the subsequent harvesting of the raisins from the vines and which possess marked advantages in the application of fluids to crops for other purposes.

2. Description of the Prior Art

Proper horticultural practice calls for the periodic application of fluids of a variety of types to plant life and their crops to prevent infestation with pests, to prevent or eradicate diseases, to achieve thinning of the crop and the like. The use of selected fluids has also been employed experimentally for more specific applications. For example, it has been known that grapes can be dried on the vine to form raisins by spraying the grapes with a solution such as potassium carbonate and methyl oleate to initiate the dehydration process. Such a solution acts greatly to reduce or to eliminate the insulating effect of the wax-like coating on the individual grapes and permits them to be dried relatively quickly on the vine by ambient temperatures and sunlight. In order to be effective, the process requires thorough coverage of the individual berries of the grapes with the solution and, thereafter, servering of selected canes of the vines. Only those canes are severed which are necessary to interrupt the flow of nutrients to the grapes thus preserving other canes to be used in the subsequent year for the bearing of crops. This severing or pruning step accelerates the drying process and reduces abscission between the raisins and their stems.

Heretofore, this process has not achieved wide usage because of severe practical difficulties. For example, complete application of the solution to the grapes is rendered difficult or impossible by the enveloping foliage of the grapevines and by the fact that grapevines trained and grown in the conventional fashion support the grapes at widely spaced elevations within the surrounding foliage. Thus, when the solution which initiates the dehydration process is sprayed on the vines by a conventional automated device, the spray is prevented from reaching much of the crop. Consequently, uneven and inadequate drying occurs unless manual direction of the spraying fluids is provided. Such manual augmentation and assistance is inefficient and largely impractical. The result has been that the vine drying of grapes has not achieved wide usage although the advantages in the use of the process, such as minimizing crop damage due to irregularities in the weather and the capability of waiting until the optimum state of development of the grapes for drying and harvesting, have long been recognized.

Therefore, it has long been known that it would be desirable to provide a method and apparatus for use in drying and harvesting vine borne crops and performing other work operations which have particular utility in the vine drying of grapes to form raisins wherein the solution employed to initiate the dehydration process is applied automatically achieving thorough and virtually complete application to the grapes and the raisins so formed can be harvested using the same apparatus operated on a fully automated basis.

SUMMARY OF THE INVENTION

Therefore, it is an object of the present invention to provide an improved method and apparatus for the growing, training, processing and harvesting of vine borne crops and the like.

Another object is to provide such a method and apparatus which facilitate the application of fluid to crops.

Another object is to provide a method of growing and training vine crops which facilitates the vine drying and harvesting of the crops.

Another object is to provide a method and apparatus which makes commercially practical the vine drying of such crops.

Another object is to provide an apparatus which has particular utility in the vine drying and harvesting of grapes.

Another object is to provide such an apparatus which permits the application of a solution which initiates the drying process to grapes in a thorough and yet efficient manner.

Another object is to provide such an apparatus which is adapted for use in a first mode of operation to apply a solution to grapes to initiate the vine drying process and which is adapted rapidly to be reconfigured into a second mode for the harvesting of the vine dried raisins using many components common to the first mode.

Another object is to provide such an apparatus which utilizes a conduit system, having a plurality of fluid vents, which is operable to create a fluid fountain through which the grapes are passed in a movement relative to the apparatus to immerse the grapes in the fluid achieving a thorough, even and virtually complete application of the fluid to the grapes.

Another object is to provide such an apparatus in which the fluid system applies the fluid at low pressure but in high volume to minimize atomization of the fluid so as to insure that virtually complete immersion is achieved.

Another object is to provide such an apparatus in which the fluid vents are of a size and configuration substantially precluding clogging with extraneous material during operation.

Another object is to provide such an apparatus in which the fluid system automatically recaptures the run-off from the grapes and grapevines, filters out extraneous material and reapplies the fluid to insure efficient usage of the fluid.

Another object is to provide such an apparatus in which the components used in the performance of the various operations of the apparatus are, in large part, common to all the operations so that a minimum of reconfiguration of the apparatus for the performance of the different operations is required.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a front elevation of the apparatus of the present invention shown in a first mode for applying fluids to crops.

FIG. 2 is a side elevation of the apparatus of FIG. 1.

DESCRIPTION OF THE PREFERRED EMBODIMENT

First Mode

Referring more particularly to the drawings, FIG. 1 shows the apparatus of the present invention at 10. The apparatus is shown disposed on the earth surface 11 above a row of grapevines 12. In the normal fashion, rows of grapevines are separated from each other by paths or spaces 13 between the rows along which the apparatus is adapted to move, as will hereinafter be described.

Figure 3:
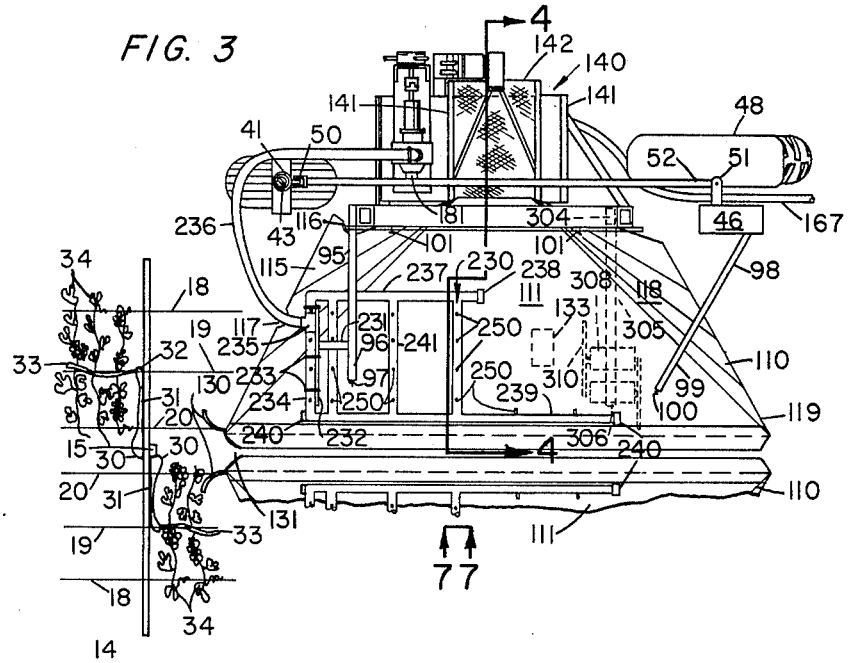
FIG. 3 is a fragmentary horizontal section taken on line 3—3 in FIG. 2.

In accordance with the method of the present invention, each row of grapevines 12 is trained and grown in a manner herein described and shown in FIGS. 1, 2, 3 and 10. Grapevines trained in accordance with this method bear some visual similarity to those disclosed in the Hiyama U.S. Pat. No. 3,564,856. However, in the method of the present invention, each row of grapevines is composed of and supported by a plurality of trellises or supports 14. Each support has a substantially vertical member or stake 15 which is secured in upright relation in the earth. A lower cross piece 16 is affixed on each support in substantially horizontal relation and normal to the vertical member. The lower cross pieces are disposed at substantially common elevations on their respective supports and are individually composed of arm portions 17 individually extending on opposite sides of their vertical member. Corresponding arm portions of the lower cross pieces of each row are interconnected by an outer trellis wire 18, a central trellis wire 19 and an inner trellis wire 20. These trellis wires are disposed in spaced, substantially parallel relation, as shown in FIGS. 1, 2 and 3, and are strung so as to be under moderate tension.

Each support has an upper cross piece 21 individually secured thereon above and substantially parallel to the lower cross piece 16. The upper cross piece is composed of arm portions 22 individually extending on opposite sides of the support. Corresponding arm portions of the upper cross pieces of the supports in a row are interconnected by a pair of spaced, substantially parallel upper trellis wires 23. The arm portions 17 and 22 on each side of each support are interconnected by vertical braces 24 which assist in maintaining the rigidity of each support.

A grapevine 30 is grown on each side of each support 14 within each row of grapevines 12. Thus, a pair of grapevines are provided individual to each support with the grapevines being substantially aligned longitudinally in the row, as best shown in FIGS. 1, 2 and 3. Each grapevine is trained to grow so as to form an upper, laterally directed portion 31 extending outwardly from the vertical member 15 along one of the arm portions 17 of the lower cross pieces 16. Thus, the portions 31 of the grapevines of each support extend in opposite directions from the vertical member and on opposite sides thereof, as best shown in FIGS. 1, 2 and 3. The portion 31 of each grapevine terminates in a head 32 adjacent to the central trellis wire 19 of its respective arm portion 17. The head of each grapevine produces canes 33 which are tied tightly on and trained to grow along their respective central trellis wire. The canes are preferably trained to grow along the central trellis wire in a direction away from the arm portion 17 so that the corresponding canes 33 of the respective grapevines of each support extend in opposite directions from the support, as can best be seen in FIG. 3. The canes 33 produce a plurality of secondary canes 34 which, in accordance with the method hereof, are laid outwardly on opposite sides of each central trellis wire and over the inner and outer trellis wires 20 and 18 respectively. Other of the secondary canes are laid over the upper trellis wires 23. In particular, a secondary cane which appears suitable for use as a cane to be trained along the central trellis wire during the next growing season and which is near the head 32 of the grapevine is laid over the upper trellis wires from each grapevine.

Figure 10:
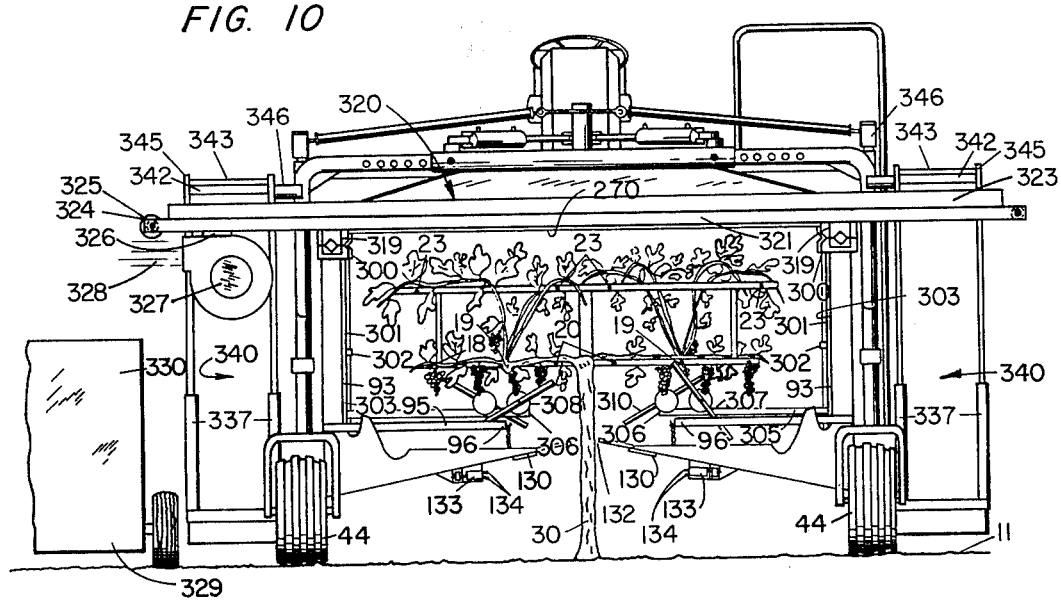
FIG. 10 is a front elevation of the apparatus of FIG. 1 reconfigured into a second mode of operation for the performance of the harvesting operation.

This method for training the growth of the grapevines 30 causes the vines to produce bunches of grapes 35 nearly all of which are suspended from the canes in a common zone or path 36 between the vertical member 15 and the remote end of the arm portion 17 and within a vertical distance of approximately twelve inches from the arm portion. Furthermore, the foliage 37 grown by the grapevines is substantially all supported above the bunches of grapes, as best shown in FIGS. 1, 2 and 10, trained upon and supported by the upper trellis wires 23. Thus, the bunches of grapes are exposed from beneath the arm portions, as best shown in FIGS. 1, 2 and 10.

The apparatus 10 has a vehicle or mobile frame 40. It will be understood that the apparatus is not limited to the specific type of mobile frame shown and described herein. The apparatus can utilize any suitable frame including a frame that is adapted to be drawn through the field as well as a self-propelled frame such as herein disclosed. However, the vehicle 40 described herein is believed to provide operative advantages in use. The vehicle has a pair of front vertical corner members 41 which are disposed in substantially parallel vertical attitudes and constitute the front corners or forward portions of the frame. The corner members have upper ends 42 and have steering shafts 43 individually rotationally extended through the corner members longitudinally thereof. Each steering shaft 43 mounts a front wheel assembly 44 on the lower end thereof for ground engagement, as best shown in FIGS. 1 and 2. The upper ends 42 of the corner members are interconnected by a front cross beam 45 extending substantially horizontally between the upper ends of the front corner members.

The mobile frame 40 has a pair of rear vertical housings 46 disposed in substantially parallel upright relation and constituting the rear corners or rearward portions of the frame. The housings 46 have upper portions 47 and mount driven wheel assemblies 48 at the lower ends thereof. The upper portions 47 of the vertical housings 46 are interconnected by a pair of substantially parallel, tubular cross members 49 extending substantially normal to and between the vertical housings. A front mount 50 is secured on each corner member. A laterally extending rear mount 51 is affixed on each vertical housing. Corner members 41 and vertical housings 46 on corresponding sides of the frame are interconnected by a pair of horizontal side members 52 which are fastened on their respective front and rear mounts, as best shown in FIGS. 2 and 3. The frame so formed thus constitutes a rigid box-like frame received for earth traversing movement on the wheel assemblies 44 and 48 in a direction of travel to the left, as viewed in FIGS. 2, 3 and 11. A forward frame 53 is mounted on and interconnects the front corner members extending diagonally upwardly and forwardly therefrom as best shown in FIGS. 1 and 2.

A support platform 60 is secured on and suspended from the front cross beam 45 and the tubular cross members 49 in substantially horizontal attitude. As previously noted, the vehicle 40 can be of any suitable type and the structural components affording the self-propelling and steering capability for the vehicle shown herein are identified for illustrative convenience as indicative of the type which can be employed. It will be understood that any suitable hydraulic, electrical and secondary power systems, not shown, are provided as necessary to make the vehicle fully mobile. An operator's seat 61 is secured on the support platform facing in the direction of the forward frame 53. A control console 62, mounting a steering wheel 63, is borne by the platform in upright relation in front of the seat. A lever assembly 64 is mounted in upstanding relation on the forward frame substantially centrally thereof. The lever assembly is operatively connected to the steering shafts 43 of the front corner members 41 by the steering linkages 65, as best shown in FIG. 1. A pair of hydraulic cylinders 66 are mounted on the forward frame 53 and connected to the lever assembly 64, in controlling relation. It will be understood that in the conventional manner, movement of the steering wheel 63 by an operator controls operation of the hydraulic cylinders 66 to control the lever assembly 64. Thus, steering for the vehicle is provided through movement of the front wheel assemblies 44 in parallelism as controlled by the operator's movement of the steering wheel.

An engine 67 is borne by the support platform 60 rearwardly of the operator's seat. A vehicle hydraulic drive motor 68 is mounted on the support platform. It will be understood that the hydraulic drive motor 67 is operatively connected for driving of the driven wheel assemblies 48 through a suitable drive train, not shown, interconnecting the hydraulic drive motor and the rear wheel assemblies by extending through the rear vertical housings 46. A fuel tank 69 is mounted on the tubular cross members 49 adjacent to the engine and connected thereto in the normal manner by suitable fuel lines, not shown. An hydraulic fluid reservoir 70 is borne by each vertical housing 46 and connected in the normal manner in supplying relation to the hydraulic system hereinafter to be described. An access ladder 71 is affixed on the support platform and frame to provide ingress and egress to and from the support platform.

Figure 11:
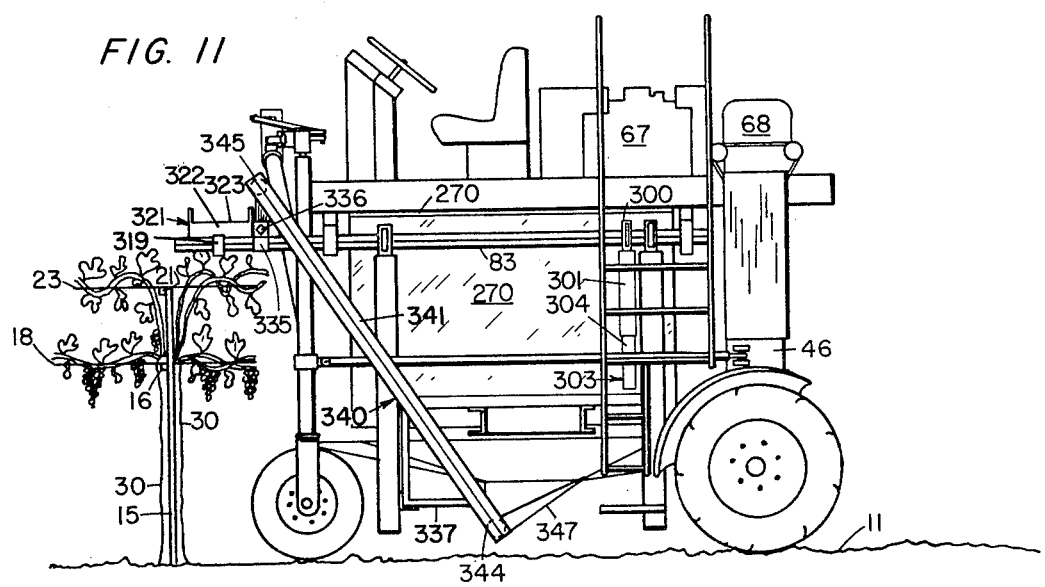
FIG. 11 is a side elevation of the apparatus of FIG. 10.

A pair of cross members 80 are mounted on the underside of the support platform 60 in spaced substantially parallel relation extending transversely of the intended direction of travel of the apparatus 10. Each of the cross members has opposite ends 81 which extend laterally beyond the sides of the support frame, as best shown in FIG. 1. A pair of clamp assemblies are individually mounted on the opposite ends of each cross member inwardly of the horizontal side members 52 of the mobile frame 40. The clamp assemblies on corresponding opposite ends 81 of the cross members on the same side of the frame mount a subframe support member 83 extending therethrough longitudinally of the mobile frame. The pair of subframe support members 83 individually have forward portions 84 which extend in front of and below the forward frame 53, as best shown in FIGS. 2 and 11.

A subframe 90 is mounted on and within the mobile frame 40. The subframe is composed of a pair of opposed portions 91, mounted in depending relation on the subframe support members 83. Each opposed portion 91 of the subframe has a pair of clamp assemblies 92 which are individually secured on their respective subframe support members 83. The clamp assemblies of each opposed portion 91 are mounted on their respective support members 83 in spaced relation, as best shown in FIGS. 2 and 11. A vertical member 93 secured on each clamp assembly and suspended vertically therebelow. The pair of vertical members 93 of each opposed portion of the subframe are interconnected by a horizontal cross member 94 mounted thereon so as to maintain the vertical members in rigid relation relative to each other.

A forward or first pair of arms 95 are individually secured, as by welding, on the cross members 94 against their respective forward vertical member 93 extending in right-angular relation thereto toward the center of the mobile frame, as best shown in FIG. 3. The subframes maintain the first pair of arms in substantially horizontal relation aligned with each other transversely of the direction of travel. The arms have remote ends 96 which individually mount hooks 97. A rearward or second pair of arms 98 are individually mounted on the rear vertical housings 46 of the mobile frame 40 and extend diagonally forwardly in converging relation to predetermined positions inwardly of the driven wheel assemblies 48, as best shown in FIG. 3, to remote ends 99. The remote ends of the second pair of arms 98 individually mount hooks 100. A pair of hooks 101 are individually secured on each of the cross members 94 of the subframe 90. The hooks of each pair are disposed in predetermined spaced relation substantially equidistant from their corresponding respective vertical members 93, as best shown in FIG. 3.

A pair of tray assemblies 110 are mounted in juxtaposition individually on the opposed portions 91 of the subframe 90. Each tray assembly has a panel, trough or tray 111 which is preferably constructed of an integral piece of sheet metal folded into the configuration shown in the drawings and described herein. The tray has a substantially flat floor portion 112 having an upper surface 113 and a lower surface 114. The tray is folded upwardly at one end thereof along a diagonal to form an upstanding front wall 115. The front wall has an arm passage 116 extending therethrough and a notch 117 both of which are disposed in predetermined positions as best shown in FIGS. 1 and 3. The tray is folded along a diagonal convergent with the diagonal of the front wall to form an upstanding rear wall 118 best shown in FIGS. 3 and 4.

Each tray has an elongated substantially straight inner lateral edge 119 and an opposite outer lateral edge or discharge portion 120 is foreshortened relative to the inner lateral edge by the convergence of the front and rear walls 115 and 118. A throat 121 is formed at the outer lateral edge defined by the floor portion 112, and the front rear walls.

A pair of outer supporting chains 122 are affixed on the front and rear walls 115 and 118 respectively adjacent to the outer lateral edges 120 of each tray. A pair of inner supporting chains 123 are fastened on the upper surface 113 of the floor portion 112 of each tray in predetermined spaced relation, as best shown in FIG. 3. Each tray is suspended from the hooks 97, 100 and 101 of its respective opposed portion 91 of the subframe 90. The outer supporting chains 122 of each tray are individually secured on the hooks 101. The inner supporting chains 123 are individually secured on the respective hooks 97 and 100 of the arms 95 and 98. Each chain is received on its respective hook by the extension of the hook through a selected link of the chain to support the tray at the desired elevation.

Figure 4:
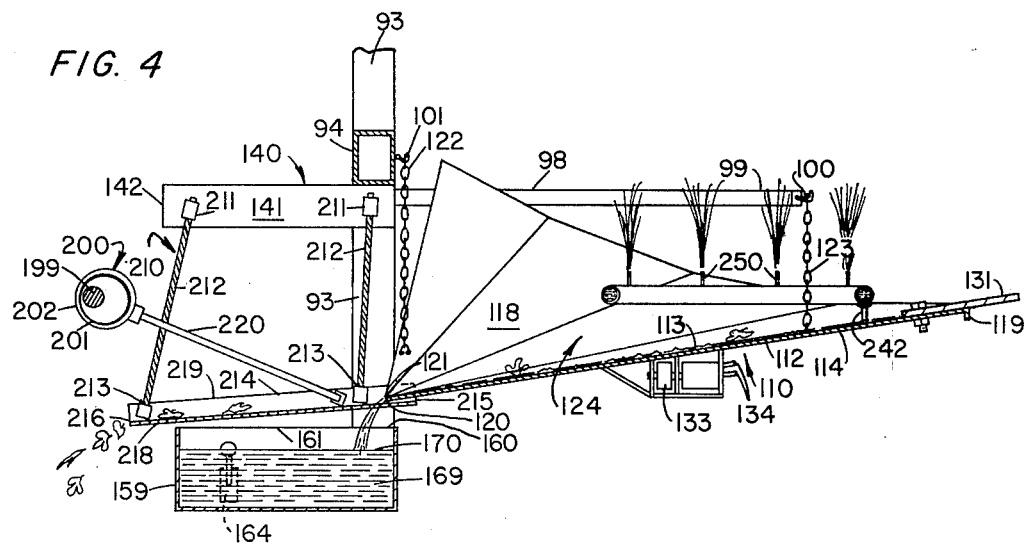
FIG. 4 is a somewhat enlarged, fragmentary, transverse vertical section taken from a position indicated by line 4—4 in FIG. 3.

The optimum relationship of the trays 111 can best be seen in FIGS. 1, 4 and 10 wherein the floor portion 112 of each tray is sloped outwardly and downwardly from the inner lateral edge 119 to the outer lateral edge 120 of the tray. It will be seen that the slope for the floor portions of the trays is more nearly horizontal in the case of the apparatus when configured in its first mode, as shown in FIG. 1, than when the apparatus is in its second or harvesting mode as shown in FIG. 10. The trays are suspended on their respective opposed portions 91 of the subframe 90 with their respective arms 95 extended through the arm passages 116 of the front walls 115. The diameter of the arm passages is preferably such that the tray does not contact the arm in any manner during use of the apparatus so that the trays are freely suspended from the arms during use.

The floor portion 112, front wall 115 and rear wall 118 of each tray 111 form a recess 124 which is tapered and sloped downwardly to the throat thereof.

A pair of guide bars 130 are individually mounted on the trays 111 extending forwardly from the inner lateral edges 119 of the trays and curved from each other, as can best be seen in FIG. 3. A pair of flap members 131 of sheet plastic, rubber or any other suitable flexible material are individually affixed on the upper surfaces 113 of the floor portions 112 of the trays extending toward each other from their respective inner lateral edges 119. The lateral edges 119 of the trays are spaced from each other to define a relatively narrow path of travel 132 therebetween into which the flap members converge. An oscillating motor 133 is mounted on the lower surface 114 of each tray 111 substantially centrally thereof. Each of the oscillating motors is adapted to have a pair of hydraulic hoses 134 connected thereto extending from the hydraulic system of the apparatus, hereinafter to be described, for actuation to impart an oscillating or vibratory action to their respective trays. As will be seen the oscillating motors are normally intended to be used only during use of the apparatus in its second mode. However, it has been found convenient to leave the motors in position during operation of the apparatus in its first mode and they can be operated during use in the first mode if desired by suitable modification of the hydraulic system as will be described.

A side frame 140 is mounted on each opposed portion 91 of the subframe 90 extending laterally therefrom, as can best be seen in FIG. 3. Each side frame is composed of a pair of parallel channel members 141 fastened, as by welding, in spaced relation on the underside of the cross member 94 of their respective opposed portion 91 of the subframe. An interconnecting member 142 is affixed on the remote, laterally extending ends of each pair of parallel channel members normal thereto.

Figure 5:
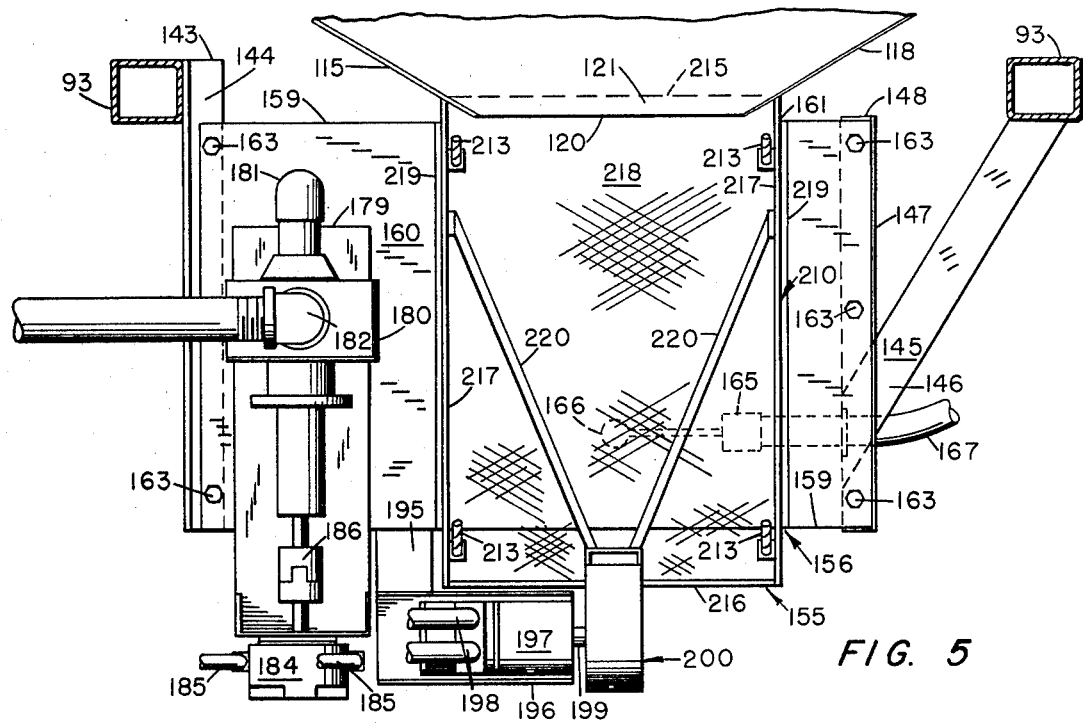
FIG. 5 is a somewhat enlarged, fragmentary, top plan view of the fluid control assembly of the apparatus.
Figure 6:
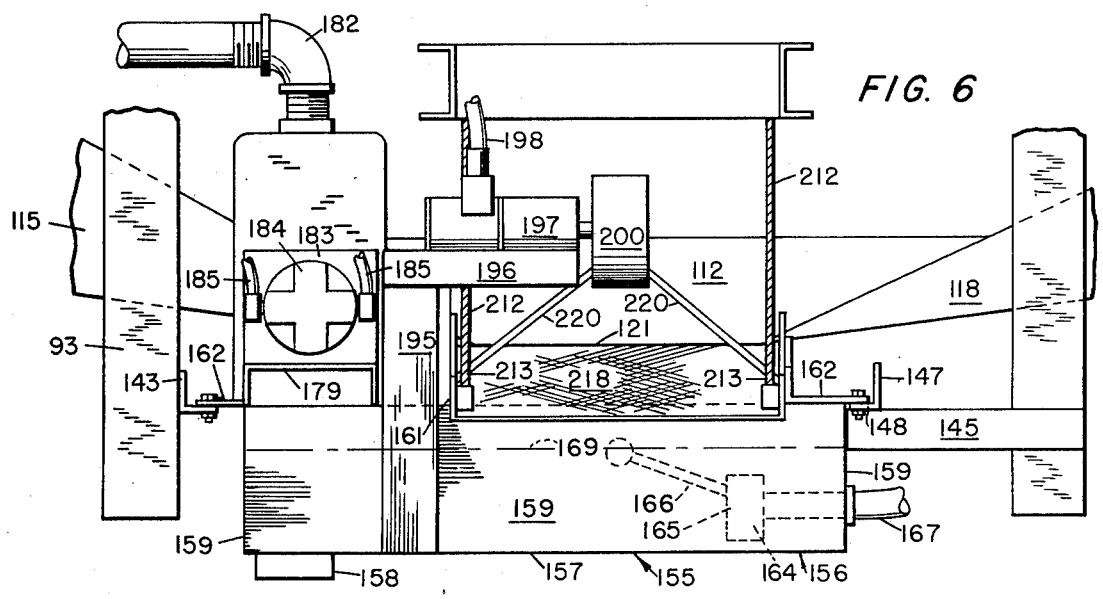
FIG. 6 is a fragmentary side elevation of the portion of the apparatus viewed in FIG. 5.

As can best be seen in FIGS. 5 and 6, the apparatus 10 has a pair of front L members 143 individually secured on the front vertical members 93 adjacent to the lower ends thereof and extending laterally of the apparatus substantially horizontal to the earth's surface 11 and in right-angular relation to their respective vertical members 93. Each of the L members has a horizontal mounting flange 144. A diagonal beam 145 is mounted on each of the rear vertical members 93 extending diagonally laterally and somewhat forwardly of the rear vertical member to a remote end 146 in predetermined spaced relation to the front L member on its respective side of the apparatus. A rear L member 147 is borne by the remote end of each diagonal beam extending substantially parallel to the front L member, as best shown in FIG. 5. Each rear L member has a mounting flange 148 disposed in substantially horizontal relation. The mounting flanges 144 and 148 on each side of the apparatus define a substantially horizontal plane.

A fluid control assembly 155 is mounted on the L members 143 and 147 on each side of the apparatus 10. Each fluid control assembly has a fluid reservoir 156 which can best be seen in FIGS. 5 and 6. The fluid reservoir has a floor 157 having a sump 158 formed therein. The reservoir has four upstanding side walls 159 and a top wall 160. The top wall has a rectangular opening 161 in the position best shown in FIG. 5. It will be understood that except for the rectangular opening, the reservoir is of fluid tight box-like construction. A pair of mounting flanges 162 are extended laterally and on opposite sides of the reservoir 156 in the same plane as the top wall 160. The mounting flanges 162 of each reservoir are individually rested on and secured to the front and rear L members 143 and 147 by bolts 163 so as to mount the fluid reservoir in substantially horizontal relation on the L members.

A bracket 164 is mounted on the floor 157 of each reservoir 156 in the interior thereof in a predetermined position shown in FIGS. 5 and 6. A float valve 165 is borne by each bracket at a predetermined elevation above the floor. Each float valve mounts a float arm 166 which operates in response to deviations in the fluid level within the reservoir to admit fluid to the reservoir through the valve to maintain a predetermined fluid level within the reservoir. A supply conduit 167 is operably connected to the float valve in fluid supplying relation and extended rearwardly therefrom through the side wall 159 of the reservoir. A tank trailer 168, shown in FIG. 2, is adapted to be drawn in trailing relation to the apparatus. As can best be seen in FIGS. 2 and 3, the fluid supply conduits 167 of the float valves extend rearwardly of the apparatus and are connected in fluid receiving relation to the tank trailer during use in the first mode of operation. For purposes of illustrative convenience, the fluid is indicated by numeral 169 in the drawings. The float valves are adapted to maintain a predetermined upper level 170 within the reservoirs. The fluid is preferably a solution of potassium carbonate [$K_2CO_3$] and methyl oleate [$C_{17}H_{33}COOCH_3$]. It will be understood that the tank trailer carries a supply of the fluid and feeds the fluid reservoirs 156, preferably by gravity flow, through the fluid supply conduits 167 as controlled by the float valves 165.

A base member 179 is mounted on the top wall 160 of each fluid reservoir 156 extending adjacent and substantially parallel to the front L member 143. A fluid pump 180 is secured on each base member 179. The pumps 180 can be of any suitable type such as a self-priming two inch centrifical pump. Each fluid pump has an intake pipe 181 which is extended downwardly through the top wall 160 of its respective fluid reservoir and has an intake end within the sump 158 of the floor 157 of the fluid reservoir. The pump has a discharge connection 182 extending upwardly therefrom and facing the direction of travel of the apparatus. A vertical member 183 is affixed on each base member 179 in upstanding relation in alignment with the fluid pump, as can best be seen in FIG. 5. A hydraulic motor 184 is secured on the vertical member 183 in alignment with the fluid pump. Each hydraulic motor has a pair of hydraulic hoses 185 which are connected at their remote ends to the hydraulic system of the apparatus for selective operation of the motors by the operator from the control console 62. A drive linkage 186 operably interconnects each hydraulic motor 184 and its respective fluid pump 180. Thus, operation of each hydraulic motor 184 drives its respective fluid pump by means of the drive linkage.

An upright housing 195 is mounted on each fluid reservoir 156 adjacent to the rectangular opening 161 of its respective top wall 160 and extending outwardly from the fluid reservoir, as best shown in FIG. 5. Each housing 195 has a support 196 secured thereon extending substantially parallel to and laterally of the outer side wall 159 of the reservoir. The support extends from its respective housing in the direction of the rear of the apparatus. A hydraulic motor 197 is secured in each support 196. Each hydraulic motor 197 mounts a pair of hydraulic hoses 198 which are connected to the hydraulic system of the apparatus by which the hydraulic motor 197 is adapted to be operated. Each hydraulic motor has a drive shaft 199 rotationally extended therefrom and on which is affixed an eccentric assembly 200. Each eccentric assembly is aligned with the rectangular opening 161 of its respective fluid reservoir and disposed in laterally offset relation thereabove, as can best be seen in FIG. 4. Each eccentric assembly has an eccentric 201 which is secured on its drive shaft 199. A follower 202 is borne by the eccentric in the conventional manner for operation thereby. Rotation of the drive shaft causes the eccentric 201 to transport the follower 202 in a reciprocating path of movement.

A separating assembly 210 constituting a cleaning station is suspended below the side frame 140 above each fluid control assembly 155. Each separating assembly has four cable mounts 211, two of which are affixed in spaced relation on each channel member 141, as can best be seen in FIG. 4. The cable mounts are adapted releasably to secure the end of a cable in fixed relation relative to the channel member. A cable 212 is individually secured in each cable mount. The cables have lower ends 213 on which a rectangular frame 214 is fastened. The frame has an inner edge 215 which is disposed beneath the outer lateral edge 120 of its respective tray 111. Each frame has an outer or lower edge 216 which is disposed at an elevation somewhat below that of the inner edge 215. Thus, the frames are extended laterally and downwardly from the outer lateral edges 120 of their respective trays. Each frame has lateral edges 217 which are spaced so that each frame covers the rectangular opening 161 of its respective fluid reservoir.

A screen 218 is affixed on each frame 214 so as to extend completely across and above its rectangular opening 161. The screen preferably extends to the inner and outer edges 215 and 216 of the frame so as to extend on opposite sides of the reservoir, as best shown in FIG. 4. A pair of guides 219 are individually mounted on the top wall 160 of each fluid reservoir on opposite sides of the lateral edges 217 of the frame 214. The guides operate to define a path of travel for the frame therebetween across the rectangular opening and under the outer lateral edge 120 of the tray. A pair of linking arms 220 are mounted on and interconnect the follower 202 of each eccentric assembly 200 and the lateral edges 217 of the frame 214. Thus, it will be seen that operation of the hydraulic motor 197 causes the eccentric assembly 200 to reciprocate the frame and screen along a path of travel across the rectangular opening of its respective fluid reservoir. The extremes of the path of movement of the screen across the rectangular opening is such that the inner and outer edges 215 and 216 respectively of the frame and the screen borne thereby never travel to a position which exposes any portion of the rectangular opening.

As can best be seen in FIG. 3, a conduit system 230 is borne by each opposed portion 91 of the subframe 90 above its respective tray assembly 110. Each conduit system has a member 231 mounted, as by welding, on the underside of its respective first arm 95 extending forwardly substantially normal to the arm 95. An arm 232 is affixed on the forwardly extending end of each member 231 extending substantially parallel to its respective arm 95. Each arm 232 mounts a plurality of clamps 233.

A first transverse conduit 234 is releasably mounted on each arm 232 by attachment of the clamps 233 thereabout. Each conduit 234 is thus mounted on the subframe parallel to its respective arm 95. Each first transverse conduit 234 mounts a coupling 235 which is connected in fluid receiving relation through a supply conduit 236 to the discharge connection 182 of the fluid pump 180 on its respective side of the subframe 90, as best shown in FIG. 3. An outer longitudinal conduit 237 is mounted on the first transverse conduit 234 in fluid receiving relation and extends rearwardly in right-angular relation thereto. The outer longitudinal conduit 237 has opposite sealed ends 238. An inner longitudinal conduit 239 is mounted on the opposite end of each transverse conduit 234 in fluid receiving relation and extends therefrom substantially parallel to the outer longitudinal conduit. Each conduit 239 has opposite sealed ends 240. The longitudinal conduits 237 and 239 of each conduit system 230 are interconnected by three substantially parallel second transverse conduits 241 which extend substantially parallel to the first transverse conduit 234 in spaced relation. Thus, during operation each conduit system is supplied with fluid by its pump 180 through the supply conduit 236 causing fluid to flow through and pressurize the interiors of the conduits 234, 237, 239 and 241. A bracket 242 is mounted on each tray is supporting relation to the rearwardmost sealed end 240 of each inner longitudinal conduit 239, as can best be seen in FIG. 4.

Figure 7:
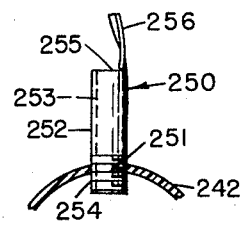
FIG. 7 is a somewhat enlarged fragmentary, vertical section taken on line 7—7 in FIG. 3 showing one of the fluid vents of the apparatus.
Figure 8:
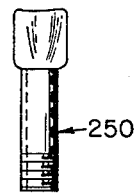
FIG. 8 is a front elevation of one of the fluid vents.
Figure 9:
FIG. 9 is a plan view of one of the fluid vents.

Each conduit system 230 mounts a plurality of fluid ports or vents 250, best shown in FIGS. 7, 8 and 9. The fluid vents are mounted on the conduit systems in a suitable pattern which can take a variety of specific configurations. The pattern shown in FIG. 3 wherein the vents are mounted on the conduits 234 and 241 in upright relation and on the conduits 239 rearwardly of the conduits 241 facing externally and generally toward the floor portion 112 of their respective tray 111 has been proven well suited to the purpose. For the pattern of FIG. 3, screw-threaded bores 251 are formed in the conduits 234 and 242 at the positions where the fluid vents are to be mounted. Each fluid vent 250 has a tubular portion 252 having an internal passage 253 of relatively large size when compared with conventional spray nozzles. It has been found that where the passage has a diameter of approximately 3/16 of an inch (approximately 0.476 cm), the fluid vents operate quite satisfactorily, as will hereinafter be described. Each fluid vent has a screw-threaded end portion 254 which is screwthreadably secured in the bore 251 to mount the vent in upright relation on its respective conduit. Each vent has a discharge opening or orifice 255 remote from the conduit with a baffle plate 256 extended upwardly thereabove. The baffle plate preferably slightly overhangs the discharge opening and is slightly arcuately curved in cross section, as best shown in FIGS. 7 through 9. It will be understood that the vents can be mounted on their respective conduits so as to assume truly vertical attitudes or can be deviated from true vertical attitudes to direct fluid flow to the areas required. Similarly, the baffle plates can be disposed so as to overhang the discharge openings to greater or lesser degrees than that shown in FIGS. 7, 8 and 9 to accomplish the desired effect. The arrangement, angles and configurations of the fluid vents should be such that a fluid fountain is created in a zone between the vertical members 15 of the supports 14 and the outer ends of the arm portions 17 of the lower cross pieces 16 and reaching vertically to a point beneath the arm portions 22 of the upper cross pieces when the apparatus is motivated along a row of grapevines 12, as shown in FIG. 1.

Preferably, three transparent fluid tight panels 257 of any suitable material, such a Plexiglass, are mounted on the subframe 90 above the tray assemblies 110. Two of the panels are preferably individually mounted on the vertical members 93 of each opposed portion 91 of the subframe in substantially vertical attitudes. The third panel is preferably secured on the underside of the support platform 60 in a substantially horizontal attitude.

Figure 12:
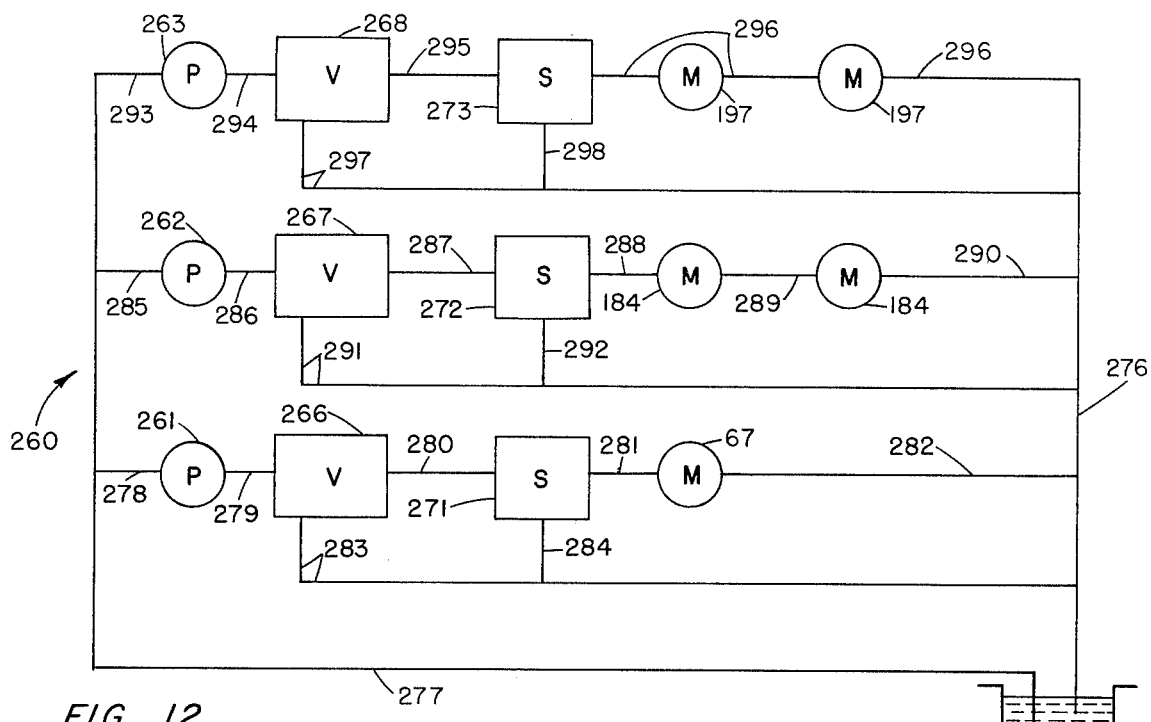
FIG. 12 is a schematic diagram of an hydraulic circuit for the apparatus in the first mode of operation.

A hydraulic circuit suitable for operation of the apparatus 10 in this first mode is indicated generally by the number 260 in FIG. 12. It will be understood that this circuit is merely representative of the types of circuits which can be employed in the operation of the apparatus. The apparatus mounts five hydraulic pumps 261, 262, 263, 264 and 265, all of which are shown schematically in FIG. 13, in any suitable location such as on the support platform 60. Pumps 261, 262, and 263 are employed during operation of the apparatus in the first mode and so only these pumps are shown in FIG. 12. Five flow dividers or proportioning valves 266, 267, 268, 269 and 270 are affixed at a suitable location on the support platform. It will be understood that the proportioning valves individually incorporate pressure relief valves, not individually identified. Valves 266, 267 and 268 are employed during operation of the apparatus in the first mode. Five on-off valves or switches 271, 272, 273, 274 and 275 are secured on the support platform at a convenient location such as adjacent to the control console 62. Switches 271, 272, and 273 are used during operation of the apparatus in the first mode.

The hydraulic circuit 260 has a hydraulic collector line 276 connected to the hydraulic fluid reservoir 70 and extending therefrom. A hydraulic supply line 277 is connected to the reservoir and extends therefrom as shown in FIG. 12. A hydraulic line 278 interconnects the supply line 277 and the pump 261. A hydraulic line 279 interconnects the pump 261 and the proportioning valve 266. A hydraulic line 280 interconnects the proportioning valve 266 and the on-off switch 271. A hydraulic line 281 interconnects the on-off switch 271 and the vehicle hydraulic drive motor 68. A hydraulic line 282 interconnects the drive motor 68 and the collector line 276. A diversion line 283 interconnects the proportioning valve 266, and more particularly the pressure relief valve thereof, and the collector line 276. A diversion line 284 interconnects the on-off switch 271 and the diversion line 283.

A hydraulic line 285 interconnects the hydraulic supply line 277 and pump 262. A hydraulic line 286 interconnects pump 262 and the proportioning valve 267. A hydraulic line 287 interconnects the proportioning valve 267 and the on-off switch 272. A hydraulic line 288 interconnects the onoff switch 272 and the hydraulic motor 184 on the left as viewed in FIG. 1. A hydraulic line 289 interconnects the hydraulic motor 184 on the left as viewed in FIG. 1 with the hydraulic motor 184 on the right as viewed in FIG. 1. A hydraulic motor 290 interconnects the hydraulic motor 184 on the right as viewed in FIG. 1 and the collector line 276. A diversion line 291 interconnects the proportioning valve 267, and more particularly the pressure relief valve thereof, and the collector line 276. A diversion line 292 interconnects the on-off switch 272 and the diversion line 291.

A hydraulic line 293 interconnects the supply line 277 and the pump 263. A hydraulic line 294 interconnects the pump 263 and the proportioning valve 268. A hydraulic line 295 interconnects the proportioning valve 268 and the on-off switch 273. A hydraulic line 296 interconnects in series relation the hydraulic motors 197 with the collector line 276, as shown in FIG. 12. A diversion line 297 interconnects the proportioning valve 268, and more particularly the pressure relief valve thereof, and the collector line 276. A diversion line 298 interconnects the on-off switch 273 and the diversion line 297.

It will be understood that during operation of the hydraulic system 260 when the pressure created in valves 266, 267 and 268 reaches a predefined upper limit the pressure relief valves, not shown, thereof operate to release hydraulic fluid pressure through their respective diversion lines 283, 291 and 297. Similarly, when the switches 271, 272 and 273 are in their "off" positions, hydraulic fluid is passed back to the reservoir 70 through their respective diversion lines 284, 292 and 298.

Second Mode

After use of the apparatus, as will be described, in the first mode, the apparatus is adapted rapidly and conveniently to be modified so as to convert the apparatus to the second mode shown in FIGS. 10 and 11. The apparatus is converted to the second mode by first removing the portions of the apparatus which are employed only in the application of the fluid to the grapevines. The supply conduits of the conduit systems 230 are preferably disconnected from the discharge connections 182 of the fluid pumps 180. The cables 212 are disconnected from the cable mounts 211. The supply conduits 167 are disconnected from their respective fluid reservoirs 156. The bolts 163 are then removed from the mounting flanges 162 of the fluid reservoirs and the fluid control assemblies 155, with their respective separating assemblies 210 attached, are removed from the apparatus. The conduit systems 220 are removed from the apparatus by releasing the clamps 233 and simply lifting the conduit systems from the apparatus.

Subsequently, the tray assemblies are individually adjusted to dispose the floor portions 112 thereof at more acute angles as shown in FIG. 10. This adjustment is accomplished by raising the chains 123 to insert their respective hooks 97 and 100 through corresponding links of the chains to foreshorten their effective lengths. This disposes the floor portion 112 at greater angles sloping in the direction of their respective throats 121.

Thereafter, the equipment hereinafter described is mounted on the apparatus 10 to complete the conversion to the second mode. A clamp assembly 300 is secured on each subframe support member 83 adjacent to and forwardly of the rearwardmost clamp assembly 92 of the support member 83, as can best be seen in FIGS. 10 and 11. A tubular beam 301 is mounted on each clamp assembly 300 in depending, substantially vertical relation. The beams 301 are somewhat closer to each other than the vertical members 93 of the subframe 90, as can be seen in FIG. 10. A locking assembly 302 is borne by each tubular beam 301. A support 303, having a slide portion 304 and an opposite horizontal portion 305 disposed in right-angular relation to the slide portion, is mounted on each tubular beam. Each support is mounted on its respective tubular beam by means of the slide portion 304 being slidably received within the beam and held in selected vertical position by the locking pin assembly 302 which releasably engages in locking relation each slide portion within its tubular beam.

The horizontal portion 305 of each support has an inner end 306 which extends to a position adjacent to the path of travel 132, as can best be seen in FIG. 10. A motor mount 307 is secured in upright relation on the horizontal portion of each support adjacent to its inner end 306. A pair of hydraulic motors 308 are mounted on each motor mount facing in opposite directions, as shown in FIG. 10, in full lines and in phantom lines in FIG. 3. Each of the motors mounts a pair of hydraulic hoses, not shown which are operably connected to the hydraulic system for the apparatus for selective operation from the control console 62. Each of the hydraulic motors mounts a pair of oppositely, radially extending flexible tubes or beaters 310. The beaters of the hydraulic motors 308 are rotated in opposite directions by the hydraulic motors in planes parallel to each other. Thus, for example, with respect to the pair of motors on the left, as viewed in FIG. 10, the beaters of the left motor are rotated in a clockwise direction and the beaters of the right motor are rotated in a counterclockwise direction, as viewed in FIG. 10. The beaters are rotated for striking or plucking one of the central trellis wires 19 of the trellises 14, as will hereinafter be described.

A mount 319 is secured on the forward portion 84 of each subframe support member 83. A cross conveyor assembly 320 is borne by the mounts 319 extending transversely of the direction of travel of the apparatus and laterally on opposite sides of the apparatus, as best shown in FIG. 10. The conveyor assembly 320 has a conveyor housing 321 which is secured on the mounts 319. The conveyor assembly mounts a conveyor belt 322 in the conventional manner which is adapted to be operated to transport material from a receiving end portion 323 on the right as viewed in FIG. 10 to a discharge end portion 324 on the left as viewed in FIG. 10. A hydraulic motor 325 is mounted on the conveyor housing 321 in operable engagement with the conveyor belt for powered movement of the belt as described.

A frame 326 is affixed on the conveyor housing 321 beneath the discharge end portion 324 thereof. A blower or fan 327 is fastened on the frame end adapted to direct an air stream 328 outwardly from under the discharge end portion of the conveyor assembly. For illustrative convenience, a trailer 329 is fragmentarily shown in FIG. 10 disposed laterally of and roughly under the discharge end portion 324 of the conveyor assembly. The trailer carries a bin 330 adapted to receive material discharged from the discharge end portion 324 of the conveyor assembly.

A mount 335 is secured on each of the subframe support members 83 immediately in front of the forward frame 53. A support bar 336 is affixed in the mounts 335 extending transversely of the direction of travel of the apparatus 10. A side conveyor support frame 337 is mounted on each front L member 143 where its respective fluid control assembly 155 has been removed.

A pair of side conveyor assemblies 340 are individually secured on the support bars 336 and the frames 337 on the opposite portions 91 of the subframe 90. Each conveyor assembly has a conveyor housing 341 mounting a conveyor belt 342 which preferably has a plurality of cleats 343 extended transversely of the belt and upwardly therefrom. Each conveyor housing extends in conforming relation about the conveyor belt and cleats thereof at the lower end of the belt to form a lower receiving end portion 344 for the conveyor assembly which gravitationally directs materials received therein onto the conveyor belt and against the cleats for transport by the belt along the inclined path of travel defined thereby, as can best be visualized in FIG. 11. Each conveyor assembly has an upper discharge end portion positioned above the cross conveyor assembly 320. The conveyor belt of each side conveyor assembly is driven by a hydraulic motor 346 in a direction carrying the upper run of the belt from the lower to the upper end portion. The hydraulic motor 346 of each side conveyor assembly is preferably mounted on its respective conveyor housing at the upper end portion thereof.

As can best be seen in FIG. 11, the lower receiving end portion 344 of each side conveyor assembly 340 is disposed below and slightly forwardly of the throat 121 of its respective tray assembly 110. A collection trough 347 is detachably mounted on the outer lateral edge 120 of each tray assembly in receiving relation to the throat 121 thereof and slopes downwardly to a position overhanging the lower receiving end portion 344 of its respective side conveyor assembly. Thus, material received by each tray 111 is gravitationally directed from the tray, along the trough and deposited on the conveyor belt 342 of the adjacent side conveyor assembly.

Figure 13:
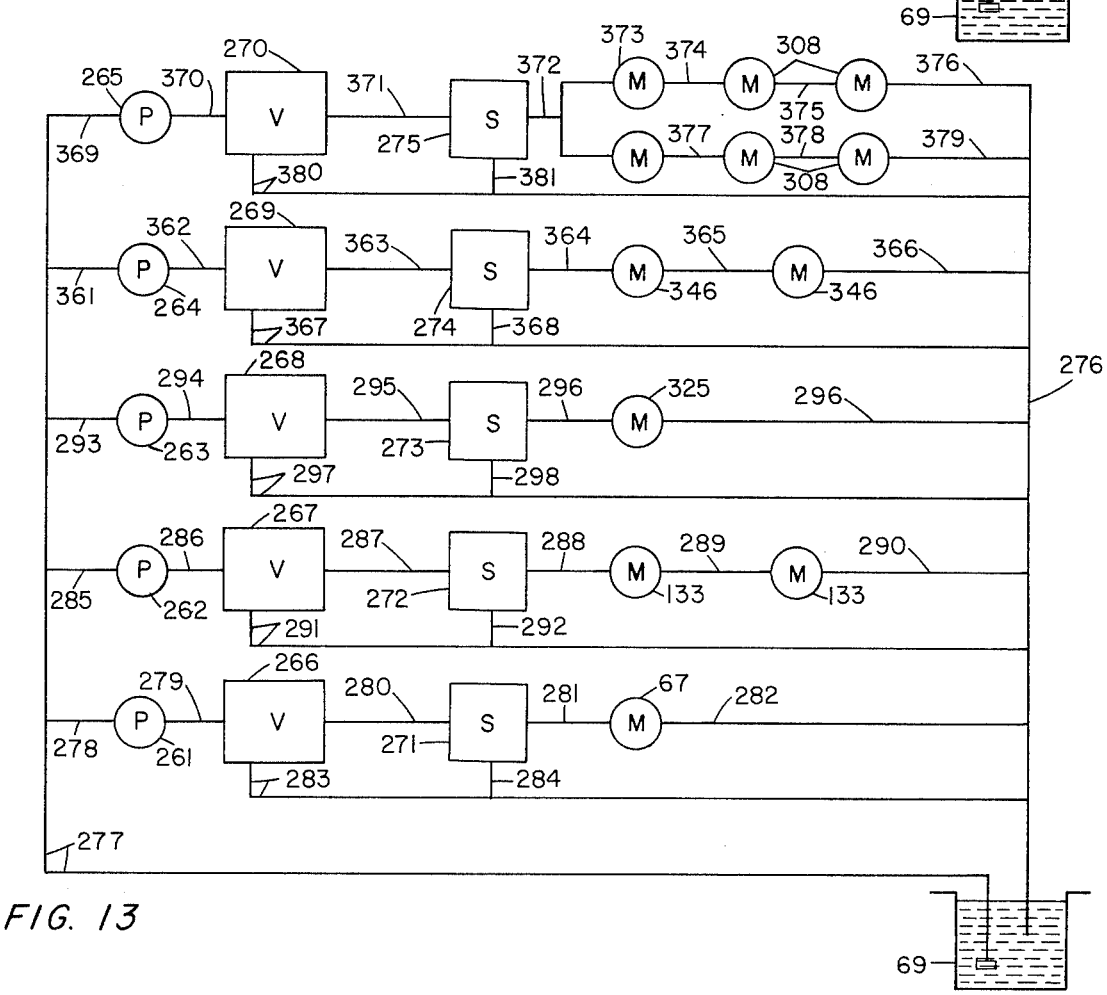
FIG. 13 is a schematic diagram of the hydraulic circuit of FIG. 12 modified for the second mode of operation.

A suitable hydraulic circuit for the second mode of the apparatus is generally indicated by the numeral 360 in FIG. 13. It will be understood that, as with hydraulic circuit 260, the circuit shown and described herein is merely intended to be representative of the types of systems which can be employed. The hydraulic circuit is varied from that of hydraulic circuit 260 as shown in FIG. 12 in several respects and must be modified in certain other respects therefrom. The portion of the circuit 260 extended through the vehicle drive motor 68 is retained in tact as previously described for the first mode.

The portion of the circuit 260 extending through the hydraulic motors 184 is modified as herein described since the fluid pumps 180 are not employed in the second mode of the invention. Modification of this portion of the circuit involves disconnection of hydraulic lines 288, 289 and 290 and reconnection of those lines to the oscillating motors 133 in series relation. As modified and shown in FIG. 13, this arrangement interconnects hydraulic line 288 with the oscillating motor 133 on the left as viewed in FIG. 10. Hydraulic line 289 interconnects the oscillating motor 133 on the left as viewed in FIG. 10 with the oscillating motor 133 as viewed on the right in FIG. 10. It will be understood that this interconnection, in reality extends the line 289 upwardly and over the frame 40 of the apparatus so as to leave the path of travel 132 between the tray assemblies 110 unobstructed. Hydraulic line 290 interconnects the oscillating motor 133 on the right as viewed in FIG. 10 and the collector line 276.

Further modification of the hydraulic circuit 260 to form the completed hydraulic circuit 360 shown in FIG. 13 involves disconnection of the hydraulic motors 197 from the hydraulic line 296. Hydraulic lin 296 is then reconnected so as to interconnect, in series relation, the on-off switch 273 and the hydraulic motor 325 and extend to the collector line 276.

The hydraulic 360 has a hydraulic line 361 interconnecting the supply line 277 and the pump 264. A hydraulic line 362 interconnects the pump 264 and the proportioning valve 269. A hydraulic line 363 interconnects valve 269 and on-off switch 274. Hydraulic line 364 interconnects the on-off switch 274 and hydraulic motor 346 on the left as viewed in FIG. 10. Hydraulic line 365 interconnects hydraulic motor 346 on the left as viewed in FIG. 10 and the hydraulic motor 346 on the right as viewed in FIG. 10. Hydraulic line 366 interconnects the hydraulic motor 346 on the right as viewed in FIG. 10 and the collector line 276. A diversion line 367 interconnects the proportioning valve 269, or more specifically the pressure relief valve, not shown, thereof, and the collector line 276. A diversion line 368 interconnects the on-off switch 274 and the diversion line 367.

A hydraulic line 369 interconnects the supply line 277 and the pump 265. A hydraulic line 370 interconnects the pump 265 and the proportioning valve 270. A hydraulic line 371 interconnects the proportioning valve 270 and the on-off switch 275. A hydraulic line 372 interconnects the on-off switch 275 with a flow divider 373. A hydraulic line 374 interconnects one outlet of the flow divider 373 and one of the beater motors 308 on the left as viewed in FIG. 10. Hydraulic line 375 interconnects the beater motors 308 on the left as viewed in FIG. 10. Hydraulic line 376 interconnects the other of the hydraulic motors 308 on the left as viewed in FIG. 10 and the collector line 276. Hydraulic line 377 interconnects the other outlet of the flow divider 373 with one of the beater motors 308 on the right as viewed in FIG. 10. Hydraulic line 378 interconnects the beater motors on the right as viewed in FIG. 10. Hydraulic line 379 interconnects the other of the beater motors 308 on the right as viewed in FIG. 10 and the collector line 276. A diversion line 380 interconnects the proportioning valve 270, or more specifically the pressure relief valve, not shown, thereof, and the collecting line 276. A diversion line 381 interconnects the on-off switch 275 and the diversion line 380.

It will be understood that as with valves 266, 267 and 268, the pressure relief of proportioning valves 269 and 270 operate to release hydraulic fluid pressure through their respective diversion lines 367 and 380 when the pressure created reaches a redefined upper limit. Similarly, when the switches 274 and 275 are in their "off" positions, hydraulic fluid is passed back to the reservoir 70 through their respective diversion lines 368 and 381.

OPERATION

The operation of the described embodiment of the subject invention is believed to be clearly apparent and is briefly summarized at this point. In accordance with the method of the present invention, the grapevines 30 are trained on the supports 14 in the manner previously described with the primary canes 33 secured on the central trellis wires 19 extending away from their respective arm portions 17 of the support, as cans best be seen in FIG. 3. The secondary canes 34 and the foliage 37 borne thereby are draped laterally over the outer and inner trellis wires 18 and 20 respectively and over the upper trellis wires 23 thereby exposing the bunches of grapes 35 beneath the foliage, as shown in FIGS. 1 and 10. One or more of the secondary canes growing from or near the head 32 of each grapevine 30 is draped over one of the upper trellis wires for use as the primary cane 33 in the next growing season.

The apparatus 10 is set up in the first mode previously described for the application of fluid to the crops. When the grapes 35 have reached the optimum condition for vine drying, the apparatus 10 is driven, by an operator seated at the control console 62, along the row 12, as shown in FIGS. 1 and 2. Thus, the opposite portions 91 of the subframe 90 are disposed on opposite sides of the row. The hydraulic circuit 260 of the apparatus is actuated to drive the hydraulic motors 184 to operate the pumps 180; and to drive the hydraulic motors 197 to operate the separating assemblies 210.

Operation of the pumps 180 causes the fluid 169, which as previously noted is preferably a mixture of potassium carbonate and methyl oleate, to be pumped from the fluid reservoirs 156, along the supply conduits 236 and into the conduit systems 230. The resulting pressurization of the systems causes the fluid to be discharged through the fluid vents 250, as can best be visualized in FIGS. 1 and 3. Since the fluid vents are relatively large in diameter, when compared with conventional spray nozzles, and since the pumps and fluid vents cooperate to produce a high volume, but low pressure discharge, the fluid is released from the vents in a substantially continuous mass in the manner of a fountain and with minimal atomization of the fluid. The fluid discharged from the vents thus creates, in effect, a fluid bath through which the bunches of grapes 35 are passed in movement relative to the apparatus. Since the bunches of grapes are suspended in a substantially uniform zone and are exposed when trained in accordance with the method of the present invention, substantially all of the grapes are fully immersed in the fluid during passage of the apparatus along the row. The fluid discharged from the fluid vents mounted on the longitudinal conduits 239 rearwardly of the transverse conduits 241 is directed over the upper surfaces 113 of the trays 111 to wash any trash dropped onto the trays, such as foliage, stems and the like, toward the separating assemblies 210.

During movement of the apparatus 10 along the row of grapevines 12, the run off from the bunches of grapes drains onto the upper surfaces 113 of the trays 111 and flows gravitationally to and through the throats 121 of the trays onto the screens 218 of the separating assemblies. The fluid thus passes through the screens and rectangular openings 161 and into the fluid reservoirs 156. Any trash passing onto the screen is separated from the fluid by continuous reciprocation of the screens by the eccentric assemblies 200 thus causing the trash to be discharged from the outer edge 216 of the frame as illustrated in FIG. 4. The transparent fluid tight panels 257 operate to confine any of the fluid which may splash beyond the grapevines although since a low pressure force is employed, this is not normally a problem. Since the panels are transparent, full visibility of the interior of the apparatus is maintained.

The float valves 165 operate to insure that fluid is admitted by gravity flow from the tank trailer 168 through the supply conduits 167 when the upper level 170 of the fluid 169 within the fluid reservoirs 156 drops below a predetermined minimum, such as indicated in FIG. 6.

It will be seen that the exposure of the bunches of grapes 35 on the grapevines as a result of the practice of the method of the present invention and the operative effect of the apparatus in releasing the fluid from the vents at low pressure but with high volume operates to insure that the grapes are virtually totally immersed in the fluid. Thus, the deficiencies encountered in the use of high pressure spraying systems, which must be used where the grapevines are trained in the conventional manner, are avoided. Conventional high pressure spray nozzles tend to clog with trash and particulate matter inherently collected during such a spraying operation because of the necessarily small diameter of their orifices. In the fluid vents used in the apparatus of the present invention, such matter which travels into the system is easily released through the fluid vents thereby freeing the system for continued operation.

It will also be seen that the apparatus can be employed in this first mode to apply a variety of other types of fluids to vines and vine borne crops. Pesticides and other treating fluids can be applied in the same manner of operation as that previously described. Since, in accordance with the method of training the vines of the present invention, the crops and foliage are supported in substantially different zones, selective application of such fluids to either the crops or the foliage is for the first time made possible.

In accordance with the process for vine drying of grapes, the next step involves selected pruning of the grapevines 30. This can be accomplished in the method of the present invention by simply severing the canes 33 relatively near the heads 32 of the vines. Since, as previously noted, the method of the present invention preferably, but not necessarily, calls for at least one of the secondary canes 34 near the head 32 of each grapevine to be draped over one of the upper trellis wires 23 for use as a primary cane in the next growing season, the canes 33 are severed beyond this selected cane so as to preserve it for such later use.

When, as a result of the method previously described, the bunches of grapes 35 have been dried on the grapevines 30 to the desired extent, the apparatus is reconfigured to form its second mode shown in FIGS. 10 and 11. This is easily accomplished by removal of the fluid control assemblies 155, installation of the supports 303 and the hydraulic motors 308, and installation of the cross conveyor assembly 320 and the side conveyor assemblies 340 in the manner previously described. The hydraulic motors 308 borne by each support should be positioned, as shown in full lines in FIG. 10 and as shown in phantom lines in FIG. 3, in longitudinal alignment with and on opposite sides of the central trellis wires 19 on its respective side of the row of grapevines 12. It has also been found desirable, as previously discussed, to increase the angles from horizontal of the floor portions 112 of the trays 111 by repositioning the inner supporting chains 123 on the hooks 97 and 100. Thus, the trays are adjusted so that they slope downwardly at a greater angle toward their respective collection troughs 347. The hydraulic circuit 260 is reconfigured as previously described to form the hydraulic circuit 360 shown in FIG. 13 and previously described. The oscillating motors 133 are preferably operated to transmit vibratory motion to the trays.

Thereafter, the apparatus 10 is driven along each row of grapevines 12, as shown in FIG. 10. During such movement the hydraulic motors 308 are operated to cause the beaters 310 to strike or pluck the central trellis wires 19 on their respective sides of the row of grapevines 12. The energy thus transmitted along the central trellis wires to the canes 33 causes the dried grapes or raisins to be dislodged from their respective bunches. The raisins fall gravitationally onto the upper surfaces 113 of the floor portions 112 of the trays 111. The panels 257 confine any raisins which may fly outwardly from the grapevines and deflect them back onto the trays. The increased angle of the floor portions and the oscillation provided to the trays by the oscillating motors 133 causes the raisins to be moved from the trays through the throats 121 thereof, the collection troughs 347 and into the lower receiving end portions 344 of the side conveyor assemblies 340. The raisins are then carried by the conveyor belts 342 and their cleats 343 upwardly to the upper discharge end portions 345 thereof from which they are gravitationally discharged onto the conveyor belt 322 of the cross conveyor assembly 320. The cross conveyor assembly then transports the raisins and discharges them from the discharge end portion 324 thereof into the bin 330 borne by the trailer 329 adjacent thereto.

The apparatus 10 can also be operated in this second mode to harvest grapes which have not been vine dried to form raisins. The operation in the second mode is substantially identical to that just described. Striking or plucking of the central trellis wires 19 causes the grapes to be discharged from their bunches.

Therefore, it will be seen that the method and apparatus of the present invention provide an efficient and dependable means for drying and harvesting vine borne crops making commercially practical the drying of such crops on their vines and the subsequent harvesting of the dried crops from the vines using the apparatus operating with relatively slight modification to perform both the drying and harvesting operations.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desired to secure by Letters Patent is:

1. An apparatus for the application of fluid to vine borne crops to facilitate drying wherein said vines are trained on trellises with the crops thereof suspended below the trellises within a substantially uniform zone, the apparatus comprising a vehicle adapted for earth traversing movement along the vines so that said crops traverse a predetermined relative path of travel through the vehicle; a panel secured on the vehicle below the path of travel defining a fluid receptacle sloped to a throat; a conduit system mounted on the vehicle between the panel and said path of travel and having a plurality of fluid discharge ports facing the path of travel; means for supplying fluid under pressure to said conduit system whereby the fluid is discharged from the ports to bathe the crops during passage along the path of travel and the residue of the fluid is gravitationally received in said receptacle; means for receiving the fluid at said throat and returning the fluid to said supplying means, the receiving means having a reservoir with an opening aligned in fluid receiving relation to the throat of the panel, and means borne by the reservoir for pumping fluid received therein to the fluid supplying means; a member having a plurality of openings mounted above the reservoir in covering relation to the opening of the reservoir for reciprocal movement along a path sloped downwardly to a discharge edge; and means connected to the member for reciprocating the member along said path of travel to cause fluid received from the throat to pass through the openings of the member into the reservoir and extraneous material to be carried along the member and discharged from the discharge edge thereof.

2. The apparatus of claim 1 including idividual means releasably mounting the conduit system above the panel and the reservoir on the vehicle and means to impart vibratory motion to the trellises to dislodge the crop into the panel releasably mounted on the vehicle and further including means dispsed in receiving relation to the throat of the panel for collecting the crop dislodged on the panel.

3. The apparatus of claim 2 wherein the motion imparting means mounts members which strike the trellises to impart crop dislodging motion thereto.

4. An apparatus for the application of fluid, capable of facilitating dehydration, to grapes growing on vines trained on supports to suspend the grapes on opposite sides of the supports substantially within vertically spaced bounds defining an area of predetermined elevation, the apparatus comprising:
A. a frame adapted for movement along the supports on opposite sides thereof so that the grapes traverse a horizontal path of travel relative to and through the frame;
B. a pair of panels mounted on the frame spaced to define a passage for the supports during said relative movement of the grapes along the path of travel in which the panels are disposed beneath said path of travel; each panel having a substantially upwardly facing recess sloping downwardly and converging to form a discharge portion remote from said passage defined by the panels;
C. a pair of reservoirs borne by the frame individually having openings disposed in receiving relation to the discharge portions of the panels;
D. a source of said fluid;
E. means interconnecting said source and each reservoir for maintaining a substantially constant predetermined level of said fluid within the reservoirs;
F. a pair of conduit systems secured on the frame individually above the panels and beneath said path of travel of the grapes, each system having a plurality of substantially upwardly facing orifices;
G. pump means interconnecting each reservoir and the adjacent conduit system for pumping said fluid from its respective reservoir and through the orifices of its respective conduit system to immerse grapes passing in relative movement along said path of travel, the residual fluid then being collected in the recesses of the panels and subsequently flowing into the reservoirs from the discharge portions thereof;
H. a perforated member mounted on each reservoir in covering relation to the opening for reciprocal movement along a sloped path of travel to separate extraneous materials from the fluid prior to flowing into the reservoir thereof; and
I. means for reciprocating each of said perforated members to discharge the extraneous material thereform.

5. The apparatus of claim 4 wherein each panel is mounted on the frame by means suspending the panel for limited movement and means connected to each panel to impart oscillatory movement to the panel to urge the fluid and extraneous material along the recesses thereof and from their respective discharge portions.

6. The apparatus of claim 4 wherein each conduit system has a plurality of orifices facing substantially toward its respective panel to direct a flow of fluid along the panel toward the discharge portion to urge extraneous material therealong.

7. The apparatus of claim 4 wherein each of each upwardly facing orifices has an effective diameter of at least about 3/16 of an inch or 0.47 centimeters.

8. The apparatus of claim 4 wherein said conduit systems and the reservoirs are mounted on the frame for removal and the frame is fitted to receive a drive motor mounting a flexible finger driven by the motor to strike the supports during said relative movement of the grapes along the path of travel to dislodge grapes, which have been dehydrated, from the vines and onto the panels.

9. The apparatus of claim 6 wherein means are borne by the frame for collecting said dehydrated grapes at the discharge portions of the panels and transporting them to a receptacle for collection.

10. The apparatus of claim 9 wherein the frame has opposite forward and rearward portions relative to the direction of relative movement of the grapes therethrough and said finger is positioned in the path of travel of the grapes nearest the rearward portion of the frame.

11. An apparatus for applying fluid, to vine borne crops to facilitate drying wherein the vines are trained on trellises with the crops thereof suspended below the trellises within a substantially uniform zone, the apparatus comprising mobile frame adapted for movement in a predetermined direction of travel along the vines to carry the crops in said zone in relative movement along a predetermined path through the vehicle; a panel borne by the mobile frame beneath said predetermined path having an upwardly open fluid receptacle facing the predetermined path and sloped downwardly laterally of the predetermined direction of travel to a discharge throat; an upwardly open reservoir mounted on the frame below the throat; a perforate member borne by the frame for reciprocal movement beneath the throat of the panel and over the reservoir; means for moving the perforate member in said reciprocal movement; and a pressurized fluid system connected in receiving relation to the reservoir and having a portion disposed between the panel and said predetermined path operable to discharge fluid upwardly into the path during said movement along the vines to bathe said crops whereby fluid received on the panel flows from the throat of the panel into the reservoir through the perforate member for reuse in the fluid system and extraneous material is removed from the fluid by the perforate member.

12. The apparatus of claim 11 wherein the perforate member is sloped downwardly from the throat of the panel to a lower edge offset relative to the reservoir and said reciprocal movement is along a path aligned with the direction of said slope of the perforate member whereby the extraneous material is discharged from the perforate member at the lower edge during reciprocal movement.

13. The apparatus of claim 11 wherein the trellises include trellis wires upon which the vines are trained, the fluid system and reservoir are mounted on the frame for removal and the frame is fitted to mount means for striking the trellis wires during movement along the vines to discharge the crops therefrom on the panel for collection below the throat of the panel.

* * * * *

UNITED STATES PATENT AND TRADEMARK OFFICE
CERTIFICATE OF CORRECTION

PATENT NO. : 4,255,922
DATED : March 17, 1981
INVENTOR(S) : Kazuo Hiyama and Howard K. Hiyama It is certified that error appears in the above-identified patent and that said Letters Patent are hereby corrected as shown below:

Abstract Page, insert, ---Assignee: Hiyama Farms, Inc., Fowler, California---;

Column 13, line 13, change "220" to ---230---;

Column 14, line 16, change "end" to ---and---;

Column 15, line 32, change "lin" to ---line---;

Column 16, line 26, change "cans" to ---can---;

Column 19, line 39, change "idividual" to ---individual---;

Column 20, line 40, change "each" to ---said---.

Signed and Sealed this

Twenty-first Day of July 1981

[SEAL]

Attest:

*Attesting Officer*

GERALD J. MOSSINGHOFF

*Commissioner of Patents and Trademarks*